Figure 3:
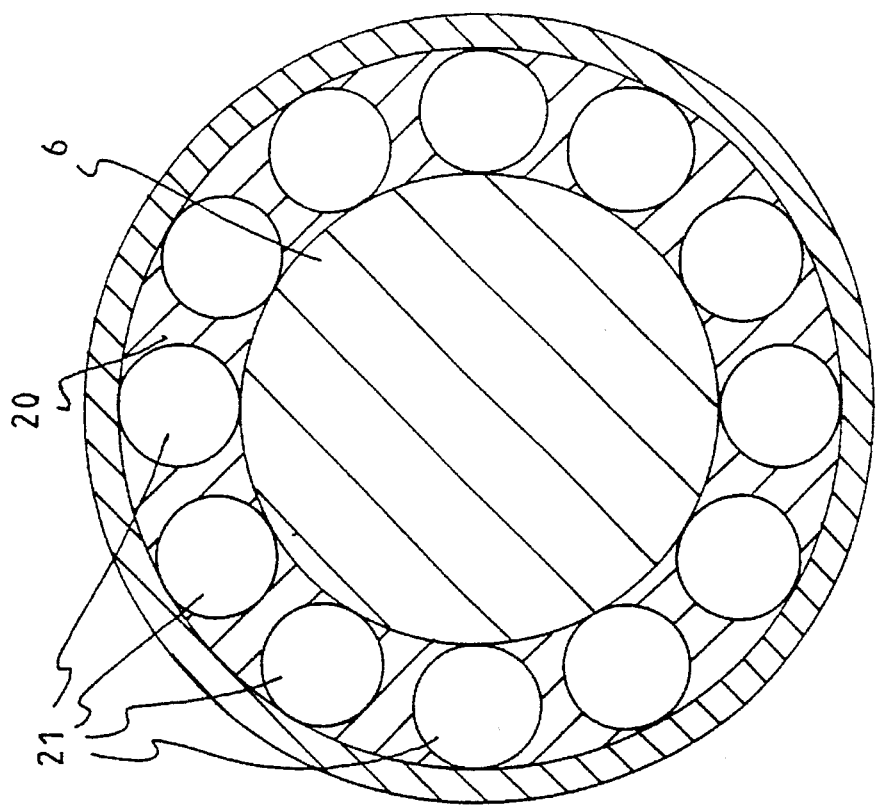

United States Patent [19]
Bergervoet et al.

[11] Patent Number: 5,596,152
[45] Date of Patent: Jan. 21, 1997

[54] FLOW STRAIGHTENER FOR A TURBINE-WHEEL GASMETER

[75] Inventors: Josephus T. M. Bergervoet, Terborg; Franciscus J. G. M. Oostendoys, Ulft, both of Netherlands

[73] Assignee: Instromet B.V., Silvolde, Netherlands

[21] Appl. No.: 421,979

[22] Filed: Apr. 14, 1995

[51] Int. Cl.⁶ .............................. G01F 1/10; F15D 1/02
[52] U.S. Cl. ......................... 73/861.83; 73/861.89; 138/44
[58] Field of Search ..................... 73/861.52, 861.77, 73/861.61, 861.79, 861.83, 861.89, 861.75; 138/40, 42, 44, 45

[56] References Cited

U.S. PATENT DOCUMENTS

| | | | |
|---|---|---|---|
| 3,572,391 | 3/1971 | Hirsch | 138/40 |
| 3,686,948 | 8/1972 | Lahaye | 73/861.83 |
| 4,308,755 | 1/1982 | Millar et al. | 73/861.77 |
| 4,438,648 | 3/1984 | Cheney, Jr. | 73/195 |
| 4,451,207 | 5/1984 | Hoffman | 73/861.89 |
| 4,503,712 | 3/1985 | Vigneaux | 73/861.35 |
| 5,341,848 | 8/1994 | Laws | 138/44 |

FOREIGN PATENT DOCUMENTS

| | | | |
|---|---|---|---|
| 34657 | 5/1908 | Austria | 73/198 |
| 874464 | 8/1961 | United Kingdom | 73/861.83 |
| 1469648 | 4/1977 | United Kingdom | 138/44 |

*Primary Examiner*—Richard Chilcot
*Assistant Examiner*—Paul D. Amrozowicz
*Attorney, Agent, or Firm*—Edmund M. Jaskiewicz

[57] ABSTRACT

Flow straightener for eliminating vortices in a gas stream through a flow tube. The flow straightener consists of a plate with a circular symmetric hole pattern, wherein the diameter of the holes is smaller than 0.1 times the diameter of the flow tube. The passage area of the holes is between 0.4 and 0.8 times the passage area of the flow tube. The diameter of the largest hole is bigger than 1.3 times the diameter of the smallest hole. The thickness of the plate is between 0.8 and 1 times the square root of the average passage area of the holes. The plate is disposed upstream in front of a turbine-wheel gas meter, which is mounted, so as to run on bearings, on a cylindrical body. In the annular gap between the cylindrical body and the flow tube, a second flow straightener is arranged consisting of a number of vanes, the ratio of the height of the vanes and the spacing between the vanes being between 0.8 and 1.

5 Claims, 2 Drawing Sheets

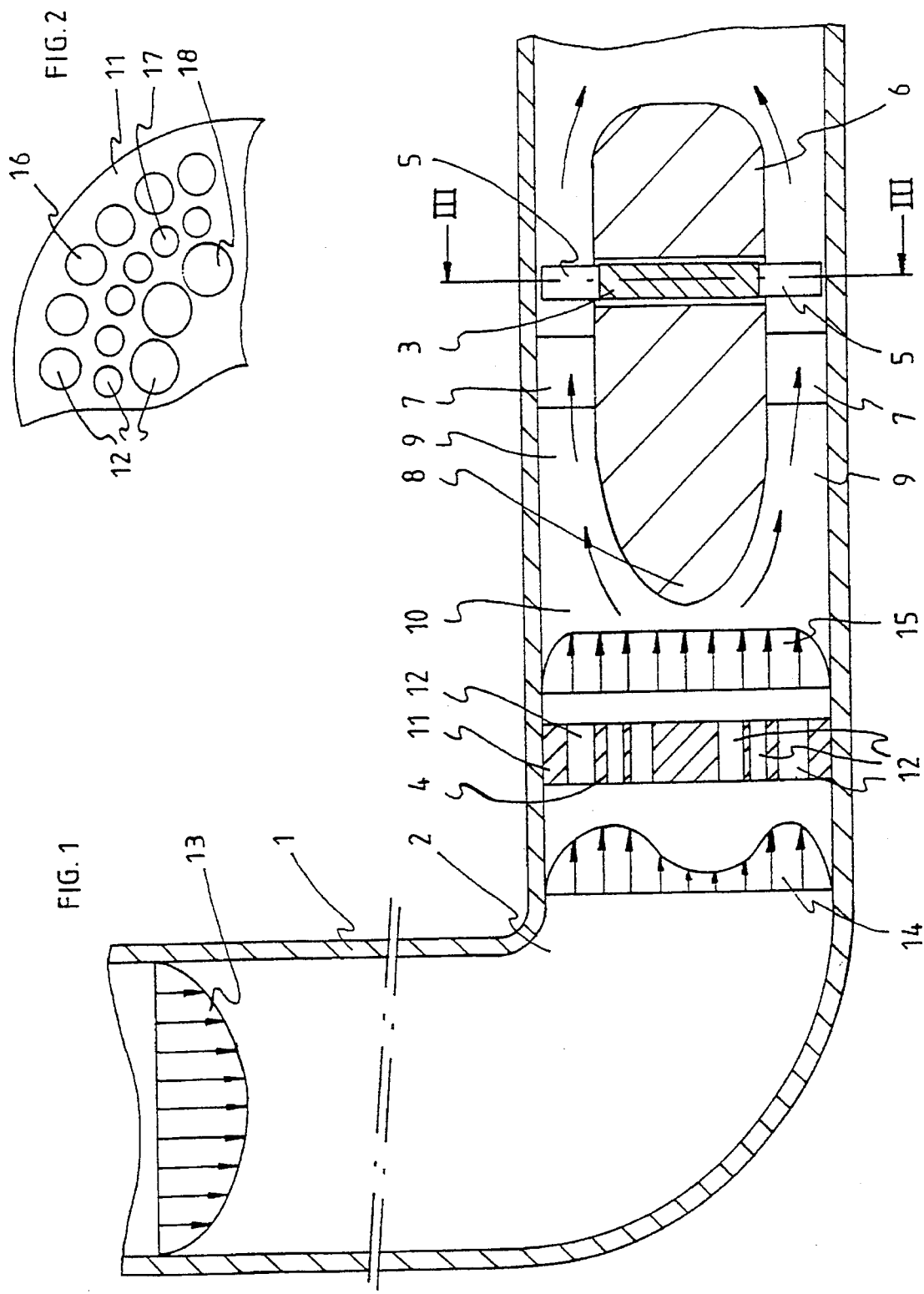

FLOW STRAIGHTENER FOR A TURBINE-WHEEL GASMETER

The invention relates to a device for influencing the flow and, more in particular, a flow straightener for eliminating vortices in a gas stream which flows through a flow tube, which device consists of a plate having a certain thickness, wherein a circular symmetric hole pattern is disposed.

Turbine-wheel gas meters are standardized and calibrated in installations having ideal flows. The gas flow approaching the meter has a circular-symmetric velocity distribution and precautions are taken, in the standardization installation, to eliminate any vortices. The flow approximates a completely developed flow profile in an infinitely long straight pipe. In practice, these meters are used in stations having many bends, valves, fittings, constrictions and expansions or even pressure controllers which cause the flow to be non-uniform and to be potentially strongly turbulent. The international standard ISO 9951 "Measurement of gas flow in closed conduits—Turbine meters" requires the manufacturer to provide fitting instructions for the meter, so that in practice the measuring error is no greater than 1/3 of the error permitted under ideal conditions. For larger flow rates this amounts to 1/3 of 1%, and for the low flow rates to 1/3 of 2%.

The dependence of a flowmeter on the flow profile with which it is presented applies not only to turbine-wheel gas meters, but also to other flowmeters such as, for example, orifice plates. For orifice plates, flow straighteners have been defined in the international standard ISO 5167. These flow straighteners should be fitted at a distance of 22 times the nominal diameter in front of the orifice plate. The next disturbance should then be situated at a distance of 20 times the nominal diameter upstream of the flow straightener. The total face-to-face dimension then becomes 44 times the nominal diameter plus the length of the flow straightener.

For turbine-wheel gas meters, similar flow straighteners are used. Since the turbine-wheel gas meter is, by its nature, less sensitive to disturbances in the flow profile, a smaller face-to-face dimension is chosen in this case, good reduction of the effect of deviating flow profiles nevertheless being obtained.

Flow straighteners consist of one or more perforated plates having holes of equal or varying size, either of an assembly of round or square tubes which are fitted in the pipe in the axial direction, or of combinations thereof.

The British Patent GB 1,375,908 discloses a flow straightener which consists of a plate having round holes. This patent describes Japanese art, which involves the use of a flow straightener consisting of a plate in which a large number of holes are disposed. These flow straighteners have been designed for use with orifice plates. These flow straighteners have been optimized for use in combination with orifice plates. All these known flow straighteners have been designed primarily for use with orifice plates, and the optimization of the fitting position has likewise been performed specifically with a view to use with orifice plates. The present invention describes a flow straightener which has been specially designed and optimized for use in combination with a turbine-wheel gas meter. An important parameter of flow straighteners is the permanent pressure head loss they cause.

The customary turbine-wheel gas meter consists of a body which, with the aid of spokes, is fitted in a tube through which gas flows. The flow is directed towards the annular gap between the central body and an outer cylinder.

A blade wheel is fitted in such a way that the blades are situated in the annular gap, the blade wheel being driven by the gas flowing through the gap. Upstream of the blade wheel, generally, simple flow straighteners are disposed, for example in the form of flat spokes between the central body and the outer cylinder. Plates provided with holes have also, in some pipes, been used as simple flow straighteners.

The dimensions of these known simple flow straighteners have not been optimized with respect to their performance, as is demonstrated when the meters are tested using disturbances according to ISO 9951. This standard specifies four configurations for generating disturbed velocity distribution. These four disturbances can be classified into two groups which are each other's mirror image. Where the one causes a vortex rotating to the left, the other causes a vortex rotating to the right. The disturbances can further be classified into one which produces a strong disturbance and one which produces a weak disturbance. The disturbance involves bringing about not only a vortex but also a marked inhomogeneity in the velocity distribution.

The object of the invention is a flow straightener which has been optimized in such a way that the above-mentioned drawbacks do not occur, and that the measurements by means of a turbine-wheel gas meter, provided with a flow straightener according to the invention, show measurements which bring the error due to disturbances within 1/3 of the nominally permitted error.

This object of the invention is achieved by means of a plate-shaped flow straightener, by the plate being provided with a number of holes which are distributed regularly over the surface of the plate and the diameter of said holes being smaller than 0.1 times the diameter of the flow tube, the total area of the sum of the cross-sections of the holes being between 0.4 and 0.8 times the area of the cross-section of the flow tube, by the diameter of the largest hole being smaller than 1.3 times the diameter of the smallest hole, by the thickness of the plate being smaller than the diameter of the largest hole and being between 1 and 0.6 times the diameter of the largest hole. Such a flow straightener according to the invention ensures that, if it is used in conjunction with a turbine-wheel gas meter and if disturbances are applied such as those described in ISO 9951, the measuring error caused by the disturbance remains within 0.2% without interposition of additional flow straighteners or additional straight lengths.

The size of the holes in the flow straightener according to the invention is, on average, equal to approximately 1/10 times the nominal pipe diameter D, and the open area may be equal to approximately 50% of the total open area, whilst nevertheless very good suppression of the vortices is obtained. As a result, the pressure head loss across the plate remains limited. Moreover, the stiffness of the plate is still such that no additional strengthening is required.

Figure 4:
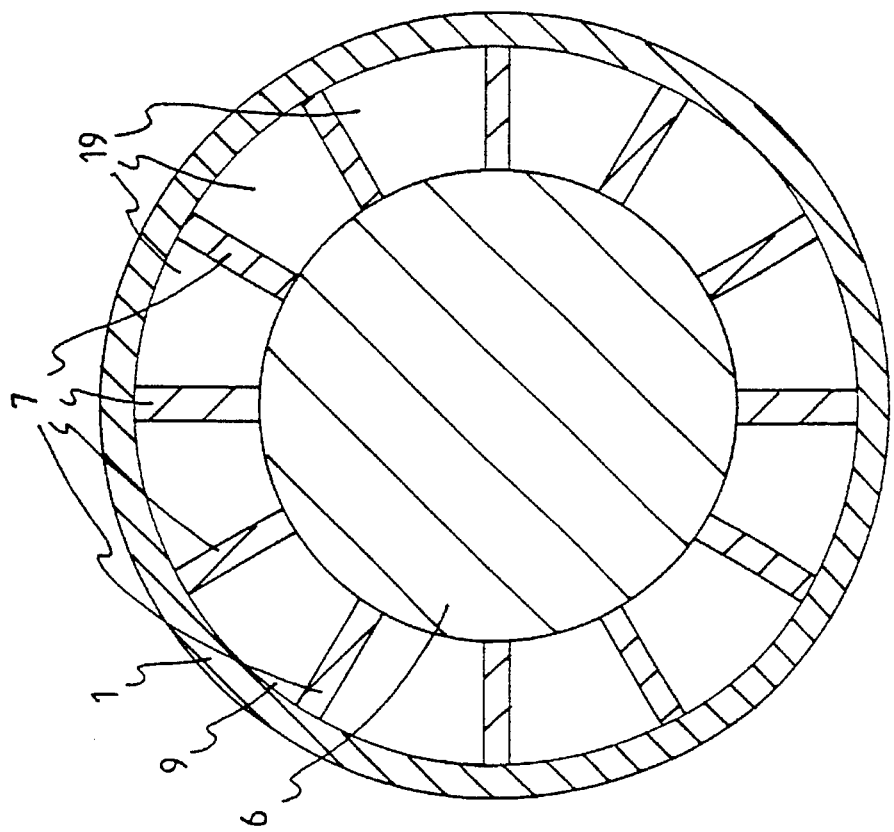

The invention will now be explained in more detail with reference to the drawings, in which:

FIG. 1: shows a conduit section 1 with a flow straightener according to the invention;

FIG. 2: shows a front view of a flow straightener according to FIG. 1;

FIG. 3: shows a transverse section of the turbine-wheel gas meter on III—III according to FIG. 1;

FIG. 4: shows a transverse section of an alternative turbine-wheel gas meter.

FIG. 1 shows a conduit section 1 with a bend 2. Incorporated in the conduit section 1 there are a turbine-wheel gas meter 3 and a flow straightener 4. The turbine-wheel gas meter 3 is provided with blades 5 and is mounted, so as to run on bearings, on a cylindrical body 6 which is concentrically disposed in the conduit section 1 with the aid of plate-shaped, radial spokes or vanes 7. The length of the vanes 7 in the axial direction is between 0.8 and 1 times the square root of the average open area of the passages between the vanes 7. That end 8 of the cylindrical body 6, which is directed towards the flow straightener 4, is streamlined and essentially conical. Between the cylindrical body 6 and the inside of the conduit section 1, there is an annular gap 9. Between the flow straightener 4 and the conical end 8 of the cylindrical body 6, a space 10 has been left clear. The flow straightener 4 consists of a circular plate 11 which is disposed in the conduit section 1 so as to fit therein. The circular plate 11 is provided with passages 12. The thickness of the plate 11 is between 0.8 and 1 times the square root of the average open area of the passages 12.

Through the conduit section 1, a gas flows from the bend 2 past the flow straightener 4 and then past the turbine-wheel gas meter 3. Before the gas reaches the vicinity of the bend 2, the gas in the centre of the conduit flows more rapidly than near the inner wall of the conduit, and the flow of the gas can be represented by a flow profile 13. A gas which, under ideal conditions, flows through a conduit without disturbances, will show a flow profile 13 of this type. After passing the bend 2, the gas in the centre of the conduit section 1 flows less rapidly than the gas which is closer to the inner wall of the conduit, and the flow of the gas can thus be represented by a flow profile 14. Would a turbine-wheel gas meter have been positioned in such a flow, the gas would flow past the blades 5 at a higher velocity, and the turbine-wheel gas meter would measure a greater flow than would be the case if the gas were to flow past the turbine-wheel gas meter in accordance with flow profile 13. In order to cause the gas to flow once more in accordance with a uniform flow distribution after the bend 2, the flow straightener 4 has been incorporated in the conduit section 1 downsteam of the bend. After passing the flow straightener 4, the gas will flow into the space 10, for example in accordance with flow profile 15. In said space 10, a transfer of momentum takes place which ensures that the flow in the annular gap 9 is virtually uniform. The gas then flows past the vanes 7 by which the cylindrical body 6 is suspended. These vanes 7 act as a second flow straightener, so that the gas, having passed the vanes, flows past the blades 5 with an even more uniform distribution. If a flow straightener 4 according to the invention has been placed upstream of a turbine-wheel gas meter 3, the measurements will, as a result, exhibit a much smaller measuring error than has hitherto been customary. If some kind of second flow straightener is used, consisting of a set of vanes, the measuring error can be reduced even further.

FIG. 2 shows a portion of a flow straightener 4. The flow straightener 4 consists of a circular plate 11 which has been provided with passages 12. The thickness of the plate 11 is between 0.8 and 1 times the square root of the average open area of the passages 12. The diameters of the passages 12 are not identical. An outermost circle of passages 12 comprises passages 16.

It has been found empirically that a very good result is obtained if, for a diameter of the conduit section of 105 mm, the diameter of the outermost passages 16 is 10 mm. Inside this circle, a second circle of passages 17 is situated, which have a diameter of 8 mm. Further inwards, a third circle of passages 18 is situated, which have a diameter of 11 mm. The total open area of all the passages 12 together is approximately 49% of the open area of the conduit section. The thickness of the circular plate then is 8 mm.

For a different tube diameter it has been found empirically, that a very good result is obtained if the diameter of the conduit section is 155 mm, in which case the outermost passages 16 have a diameter of 15 mm, the middle passages 17 a diameter of 12 mm, while the passages 18 in the innermost circle have a diameter of 16 mm. The total open area of all the passages 12 together is then again approximately 50% of the open area of the conduit section. The thickness of the circular plate is again between 0.8 and 1 times the square root of the average open area of the passages 12 and, in this embodiment, therefore amounts to 12 mm.

FIG. 3 shows, in transverse section on III—III from FIG. 1, the circular body 6 which is suspended in the conduit section 1 by means of spokes or vanes 7. The vanes 7 are disposed at identical mutual distances with respect to one another and divide the annular gap 9 into passages 19 which are all of equal size. The length of the vanes 7 in the axial direction is between 0.8 and 1 times the square root of the average open area of the passages 19. The spacing between two adjacent vanes 7 is approximately equal to the height of the vanes 7 in the radial direction. The vanes 7 thus act as a second flow straightener. It has been found that under these conditions, vortices are virtually entirely eliminated. In the case of shorter vanes 7, the vorticity is not entirely damped out, whereas in the case of longer vanes 7, the vortices are converted into vortices rotating in the opposite direction.

FIG. 4 shows, in cross-section, another possible embodiment of a turbine-wheel gas meter, the circular body 6 being suspended in the conduit section 1 by means of an annular plate 20 in which circular passages 21 are disposed. In order to have an open area identical to that of the passages 19 between the vanes 7 from FIG. 3, the circular passages 21 in this turbine-wheel gas meter should be designed with a diameter which is greater by a factor 1.13 than the height of the vanes 7 from FIG. 3.

We claim:

1. A flow straightener device for eliminating vortices in a gas stream which flows through a flow tube having a wall to a turbine-wheel gas meter disposed centrally within the flow tube to define an annular gap between the wall of the flow tube and the turbine-wheel gas meter, said turbine-wheel gas meter having a blade wheel disposed in said annular gap, said device comprising a plate having a certain thickness and further having a plurality of holes there through distributed regularly over the plate and defining a circular symmetrical hole pattern, said plate disposed upstream of the blade wheel of the turbine-wheel gas meter and the distance between the gas meter and the plate is between 0.1 and 10 times the diameter of the transverse cross-section of the flow tube, the diameter of said holes being smaller than 0.1 times the diameter of the flow tube, the total area of the sum of the cross-sections of the holes being between 0.4 and 0.8 times the area of the cross-section of the flow tube, the diameter of the largest hole is smaller than 1.3 times the diameter of the smallest hole and the thickness of the plate is smaller than the diameter of the largest hole and is between 1 and 0.6 times the diameter of the largest hole such that a uniform flow distribution in said annular gap is obtained.

2. Device according to claim 1 wherein the thickness of the plate is between 0.8 and 1 times the square root of the average cross-section of the holes disposed in the plate.

3. Device according to claim 7 wherein there is disposed, in the annular gap, a second flow straightener which consists of a number of spokes or vanes, the ratio of the height of the spokes and the spacing between the spokes or vanes being between 0.8 and 1, and the length of the spokes or vanes in the axial direction being between 0.7 and 1 times the average diameter of the holes.

4. Device according to claim 1 wherein there is disposed, in the annular gap, a second flow straightener which consists of a plate provided with a regular pattern of a number of holes, the largest hole being smaller than 1.3 times the smallest hole and the thickness of the plate being smaller than the diameter of the largest hole.

5. A device according to claim 1 wherein there is disposed in the annular gap a second flow straightener comprising an annular plate having a plurality of circular holes therein, the ratio of the height of the circular holes and the pitch between adjacent holes being between 0.8 and 1.

* * * * *